United States Patent
Tabushi (10) Patent No.: US 9,648,203 B2
(45) Date of Patent: May 9, 2017

(54) FACSIMILE APPARATUS FOR EXECUTING DIRECT-PRINT RECEPTION, MEMORY RECEPTION, AND INTERRUPTION PRINTING PROCESS, AND PRINTING METHOD FOR FACSIMILE APPARATUS

(71) Applicant: BROTHER KOGYO KABUSHIKI KAISHA, Nagoya, Aichi (JP)

(72) Inventor: Chika Tabushi, Aichi (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 15/050,578

(22) Filed: Feb. 23, 2016

(65) Prior Publication Data
US 2016/0255230 A1  Sep. 1, 2016

(30) Foreign Application Priority Data

Feb. 27, 2015 (JP) .................................. 2015-038051

(51) Int. Cl.
*H04N 1/32* (2006.01)
(52) U.S. Cl.
CPC ..... *H04N 1/32673* (2013.01); *H04N 1/32448* (2013.01)
(58) Field of Classification Search
None
See application file for complete search history.

(56) References Cited

U.S. PATENT DOCUMENTS

| 5,644,405 | A | | 7/1997 | Sato | |
|---|---|---|---|---|---|
| 5,963,340 | A | * | 10/1999 | Kim | H04N 1/32005 358/404 |
| 6,307,639 | B1 | * | 10/2001 | Eom | H04N 1/00204 358/1.13 |
| 6,504,621 | B1 | * | 1/2003 | Salgado | G06F 3/1285 358/1.1 |

(Continued)

FOREIGN PATENT DOCUMENTS

| JP | H05-41759 A | 2/1993 |
|---|---|---|
| JP | H08-18713 A | 1/1996 |

(Continued)

*Primary Examiner* — Ming Hon
(74) *Attorney, Agent, or Firm* — Scully, Scott, Murphy & Presser, P.C.

(57) ABSTRACT

A facsimile apparatus is configured execute, as a reception method, a direct-print reception or a memory reception; switch the reception method from the direct-print reception to the memory reception when an instruction to execute a print job is received when the direct-print reception being executed; execute interruption printing by causing the printing device to print images in accordance with the print job after the reception method is switched to the memory reception; determine whether available capacity of the storage device used in the memory reception is less than a threshold value when the memory reception is being executed; stop the interruption printing when the available capacity of the storage device is less than the threshold value; and execute a particular printing process to print the facsimile data in the storage device and release the storage area corresponding to the facsimile data representing the printed image after the interruption printing is stopped.

14 Claims, 7 Drawing Sheets

(56) References Cited

U.S. PATENT DOCUMENTS

| | | | | |
|---|---|---|---|---|
| 2002/0080401 | A1* | 6/2002 | Abe | G06F 3/126 358/1.15 |
| 2005/0062999 | A1* | 3/2005 | Fujinaga | G06F 3/1208 358/1.14 |
| 2007/0216968 | A1* | 9/2007 | Enomoto | H04N 1/00347 358/498 |
| 2007/0291301 | A1* | 12/2007 | Ozawa | H04N 1/00209 358/1.15 |
| 2008/0080008 | A1* | 4/2008 | Yamamoto | G06K 15/00 358/1.18 |
| 2009/0161168 | A1* | 6/2009 | Miyamoto | H04N 1/32122 358/442 |
| 2012/0081728 | A1* | 4/2012 | Yamazaki | H04N 1/32374 358/1.13 |
| 2014/0198331 | A1* | 7/2014 | Bin | G06F 9/4418 358/1.13 |
| 2015/0092208 | A1* | 4/2015 | Adachi | G06F 3/1276 358/1.13 |

FOREIGN PATENT DOCUMENTS

| | | |
|---|---|---|
| JP | 2001-127928 A | 5/2001 |
| JP | 2004-201335 A | 7/2004 |
| JP | 2008-177817 A | 7/2008 |

* cited by examiner

FACSIMILE APPARATUS FOR EXECUTING DIRECT-PRINT RECEPTION, MEMORY RECEPTION, AND INTERRUPTION PRINTING PROCESS, AND PRINTING METHOD FOR FACSIMILE APPARATUS

CROSS-REFERENCE TO RELATED APPLICATION

This application claims priority under 35 U.S.C. §119 from Japanese Patent Applications No. 2015-038051 filed on Feb. 27, 2015. The entire subject matter of the application is incorporated herein by reference.

BACKGROUND

Technical Field

Aspects of the present disclosures relate to a facsimile apparatus and a printing method which can be employed in the facsimile apparatus. More specifically, aspects of the disclosures relate to an interruption printing to cause a job accompanied with printing to be interrupted during printing of facsimile data received in accordance with a facsimile communication.

Related Art

Conventionally, facsimile apparatuses capable of executing a direct-print reception to receive facsimile data in accordance with a facsimile communication and print images of the facsimile data as received, and a memory reception to receive the facsimile data and store the received facsimile data in a storage device without printing the images of the received facsimile data have been known. In the following description, a facsimile apparatus which is executing the direct-print reception and memory reception will be expressed such that a reception mode of the facsimile apparatus a direct-print reception mode and a memory reception mode, respectively.

SUMMARY

Among such facsimile apparatuses, there is known a facsimile apparatus configured such that the reception mode is switched from the direct-print reception mode to the memory reception mode when a job accompanying a print job such as a copying job is received during the direct-print reception is being executed so that an interruption printing to execute printing according to the received interruption job is executed.

The above-described conventional apparatus has a following problem. During execution of the interruption printing, the facsimile apparatus keeps receiving the facsimile data. Therefore, it would occur shortage of an available capacity of a storage device in which the received facsimile data is stored during execution of the interruption printing. When the shortage of the available capacity occurs, the facsimile apparatus cannot receive the facsimile data anymore.

In consideration of the above problem, aspects of the present disclosures provide an improved facsimile apparatus which is configured to securely receive the facsimile data even after an interruption printing operation has been started.

According to aspects of the disclosures, there is provided a facsimile apparatus having a facsimile communication device configured to execute a facsimile communication; a printing device configured to print an image on a printing sheet, a storage device and a controller. The controller is configured to execute a reception process, a switching process, an interruption printing process, a determination process, a stoppage process and a particular printing process. The reception process in which the controller executes, as a reception method, one of a direct-print reception and a memory reception, the controller causing the printing device to print an image represented by facsimile data on the printing sheet in response to receipt of the facsimile data in accordance with the direct-print reception, the controller stores the facsimile data in a storage area allocated in the storage device in accordance with the memory reception. In the switching process, the controller switches the reception method from the direct-print reception to the memory reception when an instruction to execute a print job associating printing operation is received when the controller is executing the direct-print reception. In the interruption process, the controller causes the printing device to print images in accordance with the print job after the reception method is switched to the memory reception. In the determination step, the controller determines whether available capacity of the storage device used in the memory reception is less than a threshold value while the memory reception is being executed. In the stoppage process, the controller stops the interruption printing process when it is determined in the determination step that the available capacity of the storage device is less than the threshold value. In the particular printing process, the controller causes the printing device to print the facsimile data stored by the memory reception in the storage device and releases the storage area corresponding to the facsimile data representing the image which has been printed by the printing device after the interruption printing is stopped in the stoppage process.

According to aspects of the disclosures, there is also provided a printing method employed in a facsimile apparatus, which includes executing, as a reception method, one of a direct-print reception and a memory reception, the controller causing a printing device of the facsimile apparatus to print an image represented by facsimile data on a printing sheet in response to receipt of facsimile data in accordance with the direct-print reception, the facsimile data being stored in a storage area allocated in a storage device of the facsimile apparatus in accordance with the memory reception, switching the reception method from the direct-print reception to the memory reception when an instruction to execute a print job associating printing operation is received when the direct-print reception being executed; executing interruption printing by causing the printing device to print images in accordance with the print job after the reception method is switched to the memory reception; determining whether available capacity of the storage device used in the memory reception is less than a threshold value when the memory reception is being executed; stopping the interruption printing when it is determined that the available capacity of the storage device is less than the threshold value; and executing a particular printing process by causing the printing device to print the facsimile data stored by the memory reception in the storage device and releasing the storage area corresponding to the facsimile data representing the image which has been printed after the interruption printing is stopped.

According to aspects of the disclosures, there is also provided a multi-function peripheral, which has a public telephone network interface (39) configured to receive a facsimile data, an operation panel configured to receive an instruction, an image scanning device configured to read an image data of an original, an image forming device configured to form an image on a sheet, a memory and a controller.

The controller has a capability to execute a direct-print reception process in which the controller causes the image forming device to form an image represented by the received facsimile data on a sheet, a memory-reception process in which the controller allocates a fax area for storing a facsimile data and store the received facsimile data in the storage area, a copying process in which the controller allocates a copy data area in the memory, causes the image scanning device to read an image on an original and form a copy data, stores the copy data in the copy data area, and causes the image forming device to form an image represented by the copy data on a sheet, and a particular printing process in which the controller causes the image forming device to form an image represented by the facsimile data stored in the storage area and release the storage area corresponding to the facsimile data representing the image which has been printed. Further, the controller configured to, in response to receiving facsimile data via the public telephone network interface, start the direct-print reception process, in a case that the controller receives an instruction via the operation panel to start the copying process while the controller is executing the direct-print reception process, terminate the direct-print reception process and start the memory-reception process, after starting the memory-reception process, start copying process, while executing the memory reception process and the interruption printing process, determine whether available capacity of the memory is less than a threshold value or not. Further, the controller is configured such that, in a case that the controller determines that the available capacity of the memory is less than a threshold value, the controller pauses the copying process and execute the particular printing process.

DETAILED DESCRIPTION OF EMBODIMENT

Hereinafter, referring to the accompanying drawings, an MFP (multi-function peripheral) 100 according to aspects of the present disclosures will be described. It is noted that the MFP 100 according to the illustrative embodiment is capable of receiving/transmitting image data using a facsimile communication, and forming images in accordance with image data which is different from the facsimile data.

Figure 1:
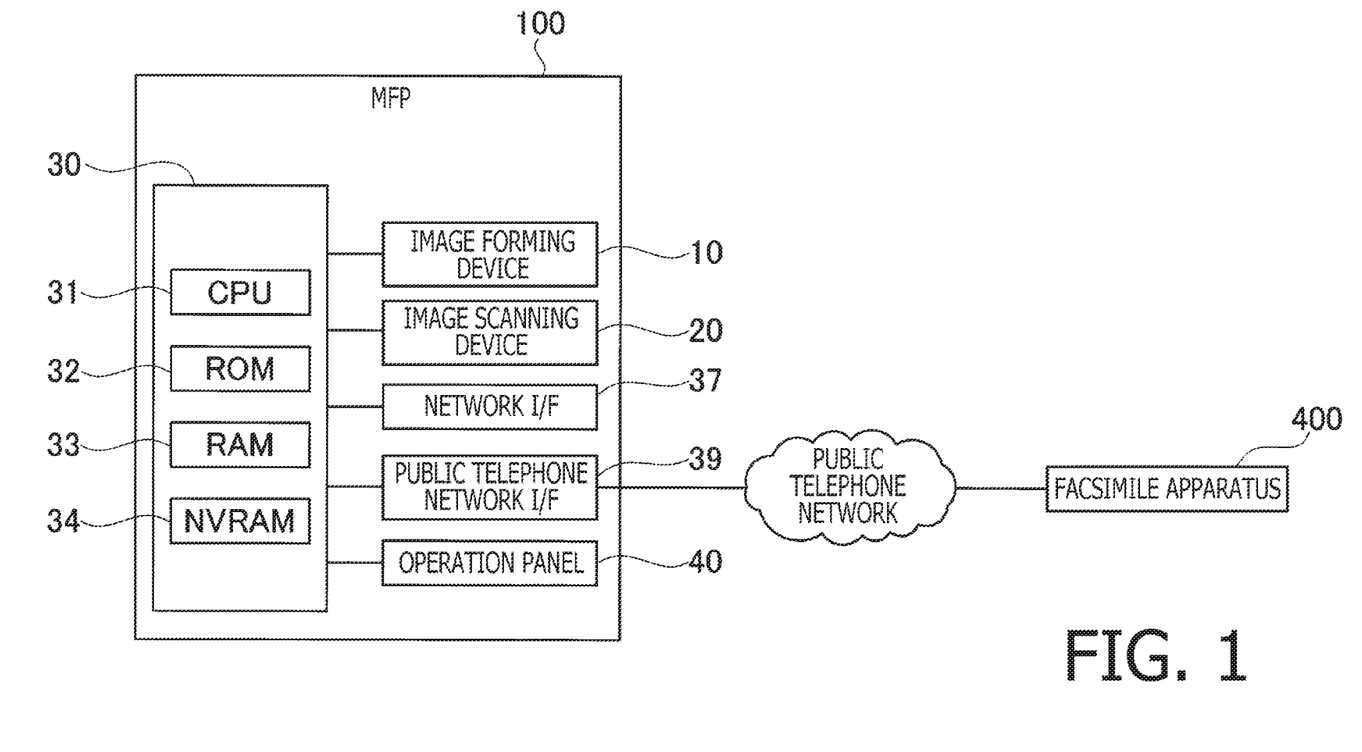
FIG. 1 is a block diagram showing an electrical configuration of an MFP (multi-function periphery) according to an illustrative embodiment of the disclosures.

As shown in FIG. 1, the MFP 100 has a controller 30 including a CPU (central processing unit) 31, a ROM (read only memory) 32, a RAM (random access memory) 33, and an NVRAM (non-volatile RAM) 34. Further, the MFP 100 has an image forming device 10, an image scanning device 20, a network interface 37, a public telephone network interface 39 and an operation panel 40, which are electrically connected to the controller 30.

The ROM 32 stores control programs, setting values, initial values and the like which are used to control the MFP 100. The RAM 33 is used as a work area in which the control programs are retrieved, and as a storage area in which data is temporarily stored. The NVRAM 34 is used as an area storing image data and the like and setting values. RAM 33 and NVRAM 34 are examples of storage device set forth in claims.

The CPU 31 controls respective components of the MFP 100 in accordance with the control programs retrieved from the ROM 32 with storing processed results in the RAM 33 or the NVRAM 34. It is noted that the CPU 31 is an example of a controller set forth in the claims. It is noted that the entire controller 30 could be interpreted as an example of the controller set forth in the claims. It should be noted that the controller 30 in FIG. 1 is a general term including hardware used to control the MFP 100 (e.g., CPU 31) and is not necessarily be interpreted to represent a single piece of hardware inside the MFP 100.

The image forming device 10 is configured to print an image on a printing sheet. It is noted that the image forming device 10 is an example of a printing device set forth in the claims. Further, it is noted that an image forming method employed in the image forming device 10 may be an electrophotographic method, or an inkjet printing method. Further, the image forming device 10 may be configured to form color images or only monochromatic images.

The image scanning device 20 is configured to scan an image on an original sheet. The image scanning device 20 is an example of a scanning device set forth in the claims. The image scanning device 20 may be of a CCD (charge coupled device) of a CIS (contact image sensor). Further, the image scanning device 20 may be configured to scan a color image or a monochromatic image.

The operation panel 40 has an LCD (liquid crystal display) and button group. The button group includes, for example, a start key, a stop key, ten keys and the like. The operation panel 40 serves to display various pieces of information and acquire a command input by the user.

The network interface 37 is hardware which is used to communicate with an external device connected to a network through a LAN (local area network) cable or the like. The public telephone network interface 39 is hardware used to communicate with an external device connected to the public telephone network through a telephone line. The public telephone network interface 39 is an example of a facsimile communication device set forth in the claims. It is noted that, when the facsimile communication is to be performed through the network, the network interface 37 is an example of the facsimile communication device set forth in the claims. In FIG. 1, as an illustrative example, a facsimile apparatus 400 connected to the public telephone line is shown.

Hereinafter, the interruption printing executed by the MFP 100 will be described. The interruption printing is started as the MFP 100 acquires the interruption printing command when the MFP 100 is receiving the facsimile data in accordance with the facsimile communication. Firstly, a facsimile communication operation when the facsimile data is received from the facsimile apparatus 400 will be described. It is noted that procedure of the facsimile communication is defined in the international standard. Therefore, in the following description on the facsimile communication, the process will be described only generally for brevity.

The MFP 100 starts a particular facsimile communication starting procedure when, for example, the MFP 100 receives a communication via the public telephone network interface 39. Firstly, as the MFP 100 responds to the received call, the telephone network is connected. Thereafter, a signal notifying the facsimile communication is transmitted from the facsimile apparatus 400. In response to the signal above, the MFP 100 transmits a signal indicating that image data can be received by the facsimile communication. Then, the facsimile communication is started. Then, between the MFP 100 and the facsimile apparatus 400, information used to determine communication settings such as a communication speed, a resolution and the like, and information regarding the image data such as a size of the image data, whether the image is a color image or a monochromatic image are exchanged.

After the above information has been transmitted/received, the MFP 100 receives the image data which is transmitted by the facsimile apparatus 400 in accordance with the determined communication settings. When all the pieces of facsimile data have been transmitted, the facsimile apparatus 400 transmits a signal indicating that the connection of the telephone line will be cut. In response to the signal indicating the telephone line will be cut transmitted from the facsimile apparatus 400, the MFP 100 transmits information confirming a disconnection to the facsimile apparatus 400, and disconnect from the public telephone network, thereby the facsimile communication operation being completed.

It is noted that, regarding reception of the facsimile data, the MFP 100 is configured to execute the direct-print reception and the memory reception. In other words, the MFP 100 is configured to operate in the direct-print reception mode and the memory reception mode. Further, the MFP 100 stores a facsimile reception setting which includes information indicating which of the direct-print reception and the memory reception is used in the NVRAM 34. It is noted that the facsimile reception setting may be determined, for example, by the user instruction which is received through the operation panel 40, and stored in the NVRAM 34. Alternatively, the MFP 100 may have a data base storing facsimile reception setting for each sender of the facsimile communication in the NVRAM 34, and retrieve the facsimile reception setting corresponding to the sender at every reception of the facsimile transmission. Thereafter, the MFP 100 determines the reception method for each job based on the facsimile reception setting.

According to the direct-print reception, the MFP 100 causes the image forming device 10 to print an image of the received facsimile data every time reception of the facsimile data for one pate is completed. That is, the MFP 100 executes the printing operation in parallel with the data receiving operation. For this purpose, the MFP 100 allocates a storage area capable of storing the facsimile data for one sheet in the RAM 33, and stores the facsimile data in the allocated area. According to the illustrative embodiment, the MFP 100 allocates the storage area on a block basis, and subsequently add a block to allocate a sufficient area depending on the storage amount.

When printing of one sheet has finished, the MFP 100 releases the storage area allocated for the facsimile data which has been printed. According to the illustrative embodiment, the MFP 100 firstly develops the received facsimile data to print data, copies the same in the storage area for printing, and releases the storage area of the original facsimile data. Therefore, when the direct-print reception job has finished, the MFP 100 does not allocate a storage area of the received facsimile data. It is noted that the image data for one sheet corresponds to one page of image data for simplex printing, while two pages of image data for duplex printing.

According to the memory reception, the MFP 100 does not execute the printing operation in parallel with the reception operation, but stores all the pieces of the received facsimile data in the RAM 33. That is, when the memory reception is executed, the MFP 100 allocates a storage area for the memory reception, and stores the received facsimile data in the allocated storage area. Accordingly, when the memory reception job is finished, the MFP 100 has the storage area for the received facsimile data in the RAM 33, and the facsimile data has been stored in the storage area. Therefore, if a print command is received, the MFP 100 retrieves the facsimile data from the RAM 33 and causes the image forming device 10 to print images based on the retrieved facsimile data. After printing is completed, the MFP 100 releases the storage area for the facsimile data which has already been printed.

Figure 2A:
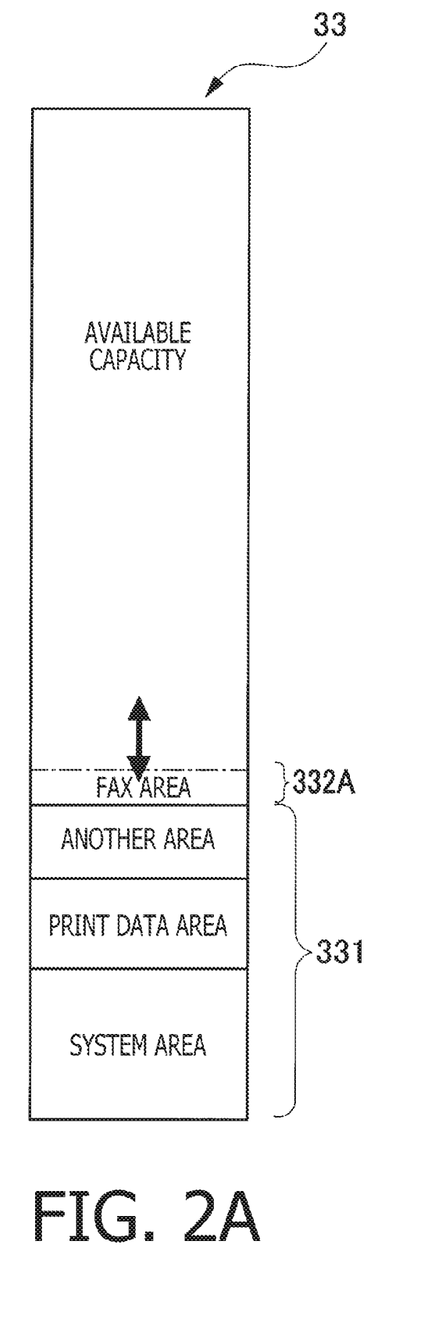
FIGS. 2A and 2B show examples of storage areas in a storage device according to the illustrative embodiment of the disclosures.
Figure 2B:
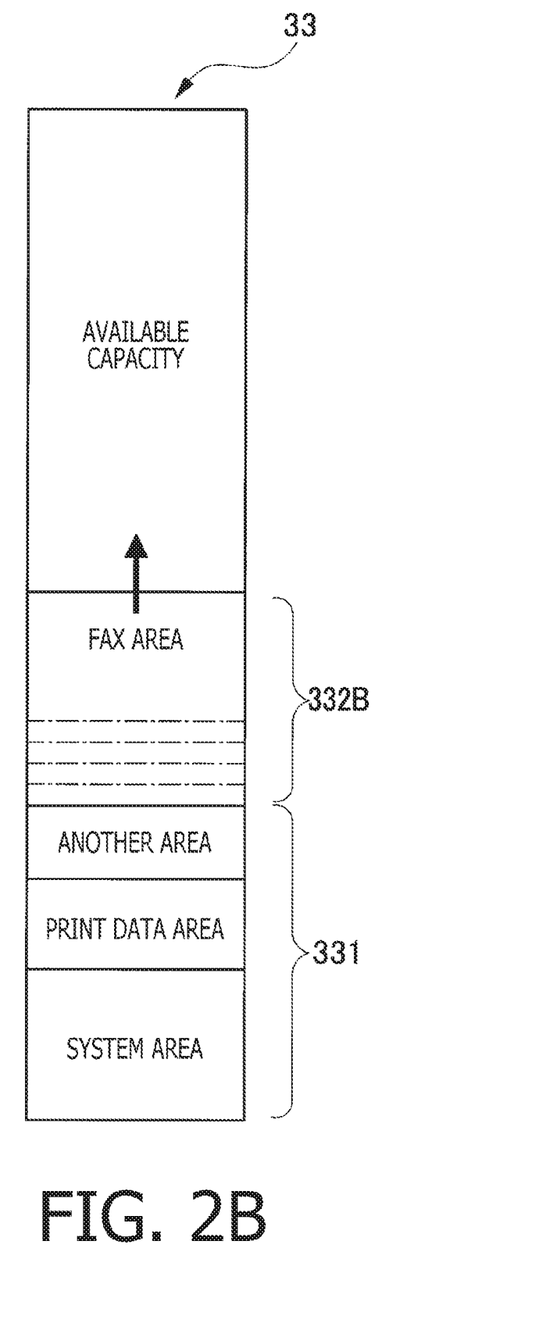

It is noted that, according to the illustrative embodiment, the entire storage area of the RAM 33 is allocated on block basis as shown in FIGS. 2A and 2B, and respective blocks are used for various purposes. FIGS. 2A and 2B schematically show the storage areas (blocks) of the RAM 33. FIG. 2A shows an example when the direct-print reception is executed, and FIG. 2B shows an example when the memory reception is executed. Among the areas in the RAM 33 of the MFP 100, a used area 331 including a system area used as a work area for the controller 30, a printer-work area used to store developed data for printing has a particular size and preliminarily defined. The used area 331 cannot be used for other purposes. Further, the used area 331 is not allowed to use for other purposes. It is noted that the size of the usable storage area of the RAM 33 is preliminarily determined depending on a system configuration.

When the direct-print reception is executed, the MFP 100 allocates a storage area depending on the necessity, and releases the area after printing. The facsimile data area 332A, which is allocated to store the received facsimile data, increases/decreases within a particular range as shown in FIG. 2A, and completed released after printing. According to the illustrative embodiment, printing tends to be faster than receipt of the facsimile data, and it is less possible that the facsimile data keeps increasing during the direct-print reception is executed.

When the memory reception is executed, a facsimile data area 332B keeps increasing as shown in FIG. 2B. Accordingly, the MFP 100 allocates the facsimile data area 332B on a particular block basis. That is, the MFP 100 additionally allocates the facsimile data area 332B by adding the particular block(s) in response to reception of the facsimile data. It is noted that, when the MFP 100 executes a printing operation based on the facsimile data stored in the facsimile data area 332B in accordance with a user's instruction, the MFP 100 releases the facsimile data area 332B after execution of printing.

Further, according to the illustrative embodiment, the MFP 100 receives instructions of the interruption printing when the facsimile data receiving process according to the direct-print reception is being executed. When the instructions of the interruption printing is received, the MFP 100 switches the facsimile data receiving method from the direct-print reception to the memory reception, thereby executing a printing job as instructed while keeping receiving the facsimile data. When the interruption printing is completed, the MFP 100 executes printing based on the stored facsimile data and releases the facsimile data area 332B thereafter.

Figure 3:
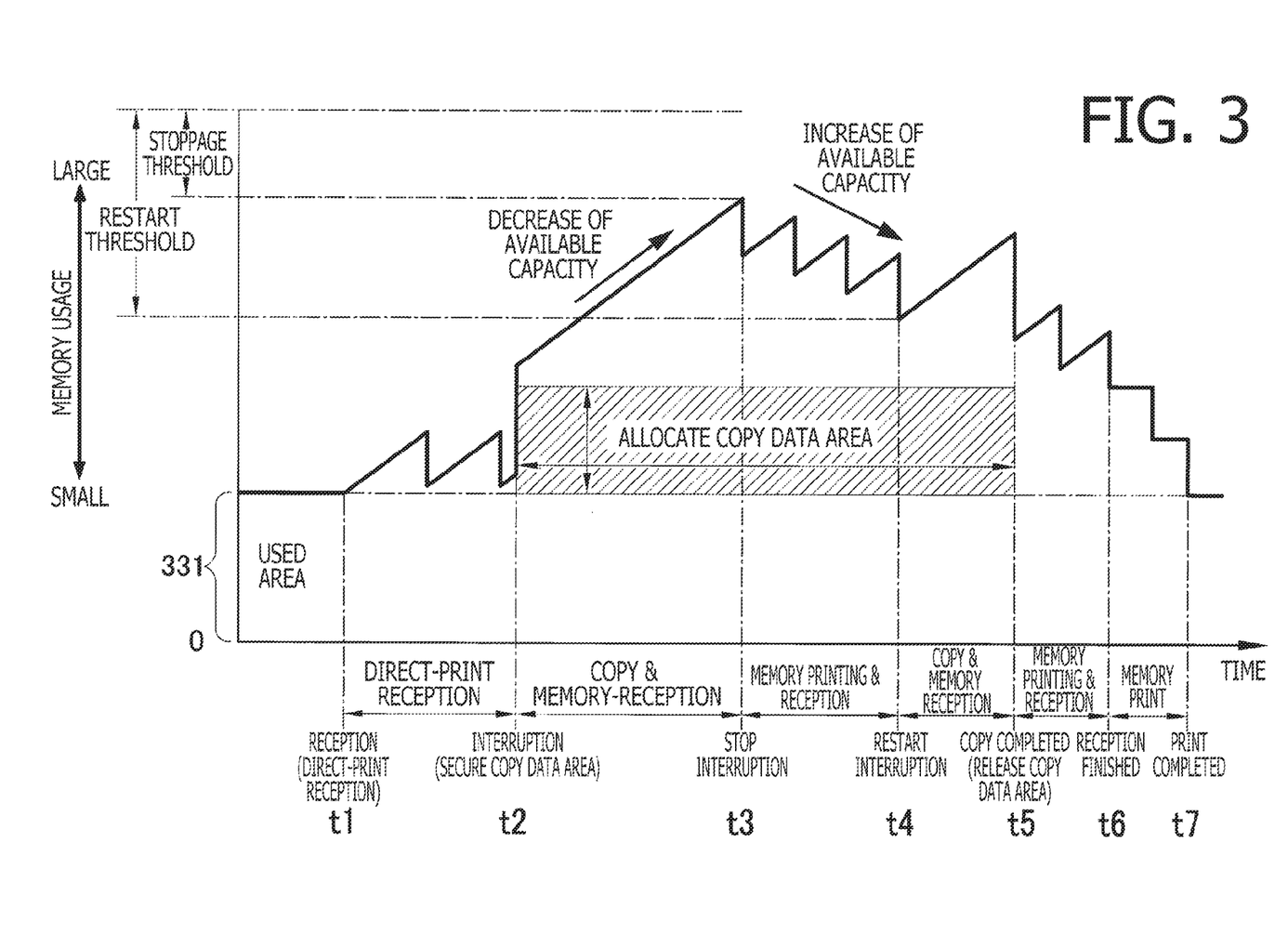
FIG. 3 is a chart showing a change of usage of a storage device according to the illustrative embodiment of the disclosures.

FIG. 3 shows an example of a change of a memory usage amount when a copy instruction is received as the interruption printing in a time series manner. As mentioned before, the used area 331 is always allocated. It is assumed that the MFP 100 starts receiving the facsimile data in accordance with the direct-print reception at time t1. During a period of the direct-print reception from time t1 to time t2, the MFP 100 repeats allocating the storage area for the facsimile data and releasing of the storage area after printing the facsimile data.

As the MFP 100 receives the copy instruction as the interruption printing at time t2, the MFP 100 allocates a copy data area as shown in FIG. 3. In a copy job, the MFP 100 scans an original sheet and stores the scanned image data. Therefore, it is necessary to allocate a storage area which stores the scanned image data. The MFP 100 keeps allocating the copy data area until the acquired copy job is completed or the copy job is interrupted. In FIG. 3, a period in which the copy data area is allocated is indicated by hatching with oblique lines.

Then, the MFP 100 switches the facsimile reception method from the direct-print reception to the memory reception, and stores the facsimile data received during execution of the interruption printing in the RAM 33 sequentially. That is, during the period from time t2 to time t3, the MFP 100 executes the copying job and the reception of the facsimile data in accordance with the memory reception simultaneously. Therefore, the usage amount of the RAM 33 gradually increases and the available capacity gradually decreases.

If the available capacity of the RAM 33 becomes smaller because of the above operations and the copying job and the reception of the facsimile data in accordance with the memory reception are continued, there is a possibility that the MFP 100 becomes unable to receive (i.e., store) the facsimile data. Therefore, as shown in FIG. 3 at time t3, the MFP 100 stops the copying job according to the interruption printing when the available capacity of the RAM 33 is less than a stoppage threshold value, and starts a memory printing which is a printing job based on the facsimile data stored in the RAM 33.

At time t3, the MFP 100 executes the memory printing and the facsimile data reception simultaneously. As mentioned before, release of the storage area due to printing tends to be proceed quicker than allocating of the storage area due to reception of the facsimile data. Therefore, it is likely that the available capacity of the RAM 33 increases after time t3.

As the memory printing is executed, the available capacity of the RAM 33 increases. Then, it becomes possible that the interruption printing, which was stopped, is restarted so that the copy job and the memory reception are executed simultaneously. Thus, at time t4 of FIG. 3, when the MFP 100 determines that the available capacity of the RAM 33 exceeds a particular restart threshold value, the MFP 100 restarts the copy job which had been stopped. It is noted that the restart threshold value is a threshold value at which the interruption printing can be restarted. It is noted that the restart threshold value is larger than the stoppage threshold value. The stoppage threshold value and the restart threshold value will be described in detail later.

If reception of the facsimile data has not been finished at time t4, the MFP 100 executes the copy job and the memory reception simultaneously. At time t4, when the copy job is finished, the MFP 100 releases the cop data area. It is noted that, if the facsimile data reception has been finished by time t5, the MFP 100 executes only the copy job thereafter until completion of the copy job.

If the facsimile data reception has not been completed at time t5, the MFP 100 executes the memory printing and the facsimile data reception, simultaneously, after time t5. After the facsimile data reception has been finished, the MFP 100 executes only the memory printing from time t5. Then, at time t7, when all the pieces of received facsimile data has been printed, the MFP 100 terminates the facsimile data reception job. After time t5, the MFP 100 gradually releases the storage area where the facsimile data as printed is stored as the printing proceeds, the used capacity of the RAM 33 gradually decreases, while the available capacity increases.

Hereinafter, processes to realize an operation of the interruption printing mentioned above will be described referring to flowcharts shown in FIGS. 4-7. Firstly, referring to FIG. 4, a job process to execute an acquired job will be described. The job process is executed by the CPU 31 of the MFP 100 in response to acquisition of a job associated with an operation of at least one of the image forming device 10 and the image scanning device 20.

Figure 4:
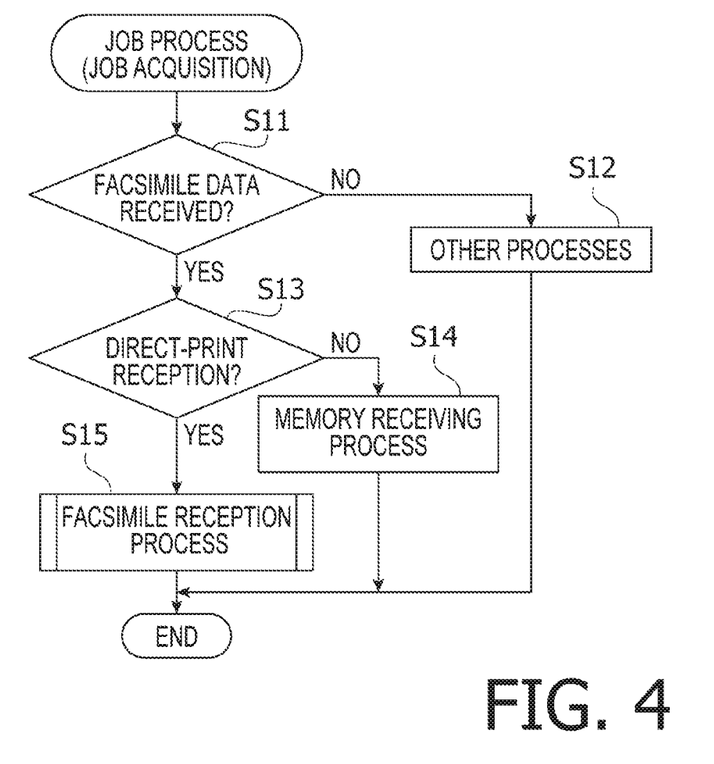
FIG. 4 is a flowchart illustrating a job process according to the illustrative embodiment of the disclosures.

In the job process, the MFP 100 determines whether the received job is the facsimile reception job (S11). When it is determined that the received job is not the facsimile reception job (S11: NO), the MFP 100 executes a process corresponding to the received job (S12). For example, when the received job is a print job received from a PC, the MFP 100 causes the image forming device 10 to execute printing based on the print job received from the PC. When it is determined that the received job is the facsimile reception job (S11: YES), the MFP 100 further determines whether the reception method of the facsimile reception job is the direct-print reception (S13).

When it is determined that the received facsimile reception job is not of the direct-print reception (S13: NO), the MFP 100 executes the memory reception (S14). That is, the MFP 100 allocates a necessary storage area in the RAM 33, and stores the received facsimile data in the thus allocated storage area of the RAM 33. When the facsimile reception is finished, the MFP 100 terminates the job process.

Figure 5:
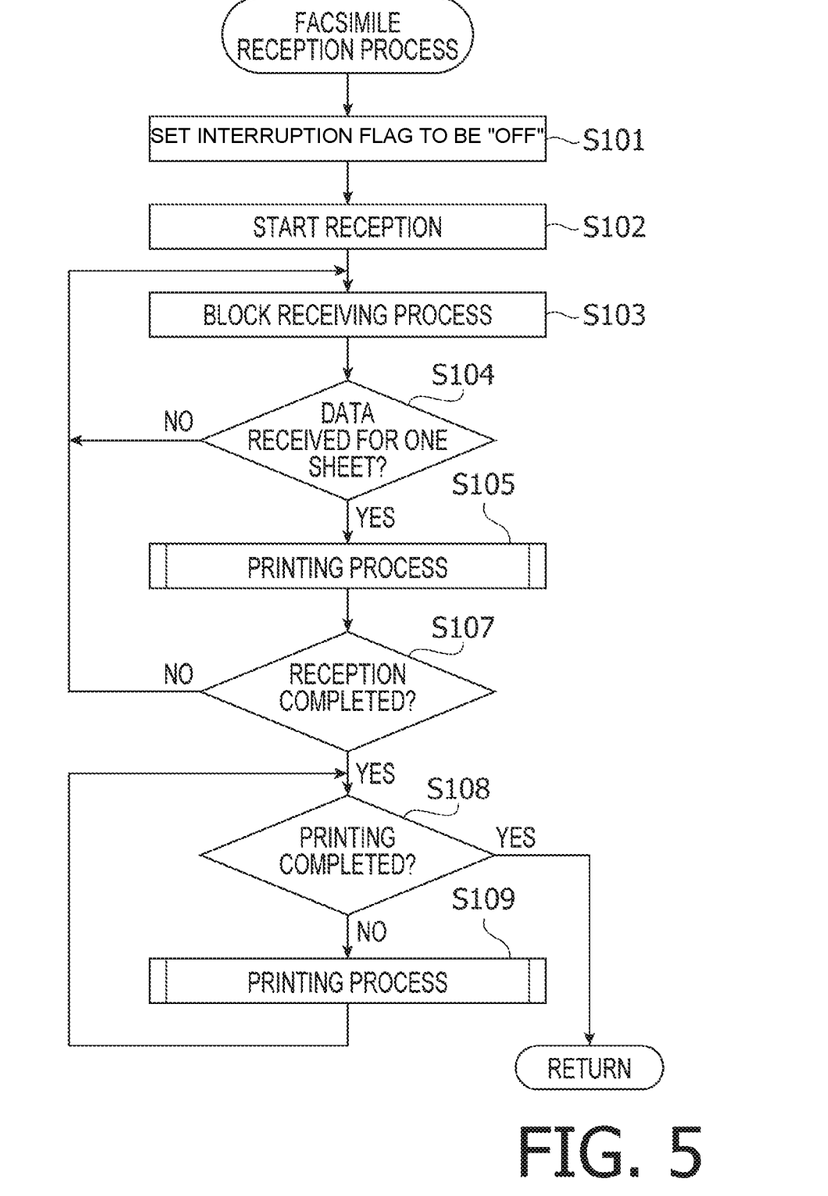
FIG. 5 is a flowchart illustrating a facsimile reception process according to the illustrative embodiment of the disclosures.

When it is determined that the received facsimile reception is of the direct-print reception (S13: YES), the MFP 100 executes a facsimile reception process (S15). Next, the facsimile reception process will be described in detail referring to FIG. 15. It is noted that the MFP 100 is capable of receiving the interruption printing during execution of the facsimile reception process. A case where the MFP 100 received the interruption printing during execution of the facsimile reception process will be described later.

In the facsimile reception process, the MFP 100 sets an interruption flag to be an OFF state (S101). The interruption flag indicates whether the interruption printing is to be executed, and is stored in the RAM 33. When the interruption flag is OFF, the interruption printing is not executed, that is, execution of the interruption printing is restricted.

The MFP 100 starts receiving the facsimile data, through the public telephone network interface 39, in accordance with a well-known facsimile communication procedure (S102). It is noted that, prior to reception of the facsimile data, the MFP 100 allocates a particular size of a storage area in the RAM 33 as a reception data memory (i.e., storage). Then, the MFP 100 stores the received facsimile data in the thus allocated storage area.

During the facsimile communication procedure, the facsimile data is transmitted from the facsimile device 400, which is a sending device, such that the facsimile data is divided into particular blocks (e.g., four kilo bytes) each of which is smaller than an amount for one sheet. Thus, the MFP 100 executes a block reception process (S103) to receive and store each block of the facsimile data. According to the illustrative embodiment, the MFP 100 firstly allocates the storage area corresponding to one block of the data in the RAM 33, receives the facsimile data by one block and stores the same in the storage area as allocated. Then, the MFP 100 further allocates another storage area corresponding to one block for the next block of the facsimile data. In such a manner, the MFP 100 keeps receiving the facsimile data.

The MFP 100 determines whether the facsimile data for one page has been received at every reception of a block of the facsimile data (S104). That is, the MFP 100 determines whether the facsimile data for one sheet has been stored in the storage area previously allocated. When it is determined that the facsimile data for one sheet has not yet been stored in the previously allocated storage area (S104: NO), the MFP 100 returns to S103 and executes the block reception process to receive the next one block of the facsimile data and store the same in the allocated storage area again. It is noted that steps S102-S104 are an example of a reception process set forth in claims.

When it is determined that the facsimile data for one sheet has already been received (S104: YES), the MFP 100 executes the printing process to print the received facsimile data for one sheet (S105).

Figure 6:
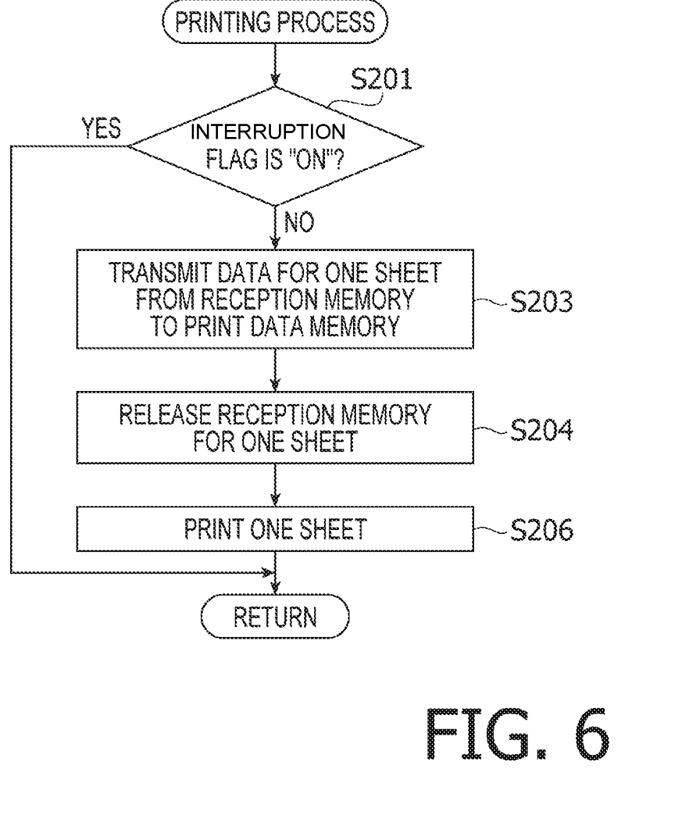
FIG. 6 is a flowchart illustrating a printing according to the illustrative embodiment of the disclosures.

Next, the printing process, which is called in S105 of the facsimile reception process, will be described with reference to FIG. 6. In the printing process, the MFP 100 firstly determines whether the interruption flag is ON (S201). As mentioned before, the interruption flag is set to "OFF" in S101 of the facsimile reception process.

When it is determined that the interruption flag is not "ON" (S201: NO), the MFP 100 retrieves the facsimile data for one sheet from the reception data memory, develops the retrieved facsimile data to data having a data format for printing and copies the developed data in the print data area (S203). Then, the MFP 100 releases the reception data memory for one sheet, which has been allocated for the facsimile data which has already been developed and copied to the print data area. Further, the MFP 100 causes the image forming device 10 to execute printing based on the data stored in the print data area (S206), and terminates the printing process.

When it is determined that the interruption flag is "ON" (S201: YES), the MFP 100 terminates the printing process without printing the facsimile data. That is, the MFP 100 terminates the printing process with the facsimile data being stored in the reception data memory. Therefore, in this case, the reception data memory is not released. A case where the interruption flag is "ON" will be described later. It is noted that the printing operation is executed by the image forming device 10 independently from the facsimile reception. Therefore, the MFP 100 can keep receiving the facsimile data, after the printing operation is started in S206, in parallel with the printing operation.

The MFP 100 returns to the facsimile reception process and, execution of the printing process in S105, the MFP 100 determines whether the facsimile reception process has been completed (S107). When it is determined that the facsimile reception process has not been completed (S107: NO), the MFP 100 returns to S103 and keeps executing reception of the facsimile data and printing of the same until the facsimile reception process is completed.

When it is determined that the facsimile reception process has been completed (S107: YES), the MFP 100 determines whether all the pieces of the received facsimile data have been printed (S108). When it is determined that printing of the received facsimile data has not been completed (S108: NO), the MFP 100 keeps executing the printing process to print the facsimile data and release the reception data memory corresponding to respective sheets (S109). It is note that the printing process at S109 is the same as the printing process in S105. When it is determined that the printing of the received facsimile data has been completed (S108: YES), the MFP 100 terminates the facsimile reception process.

Figure 7:
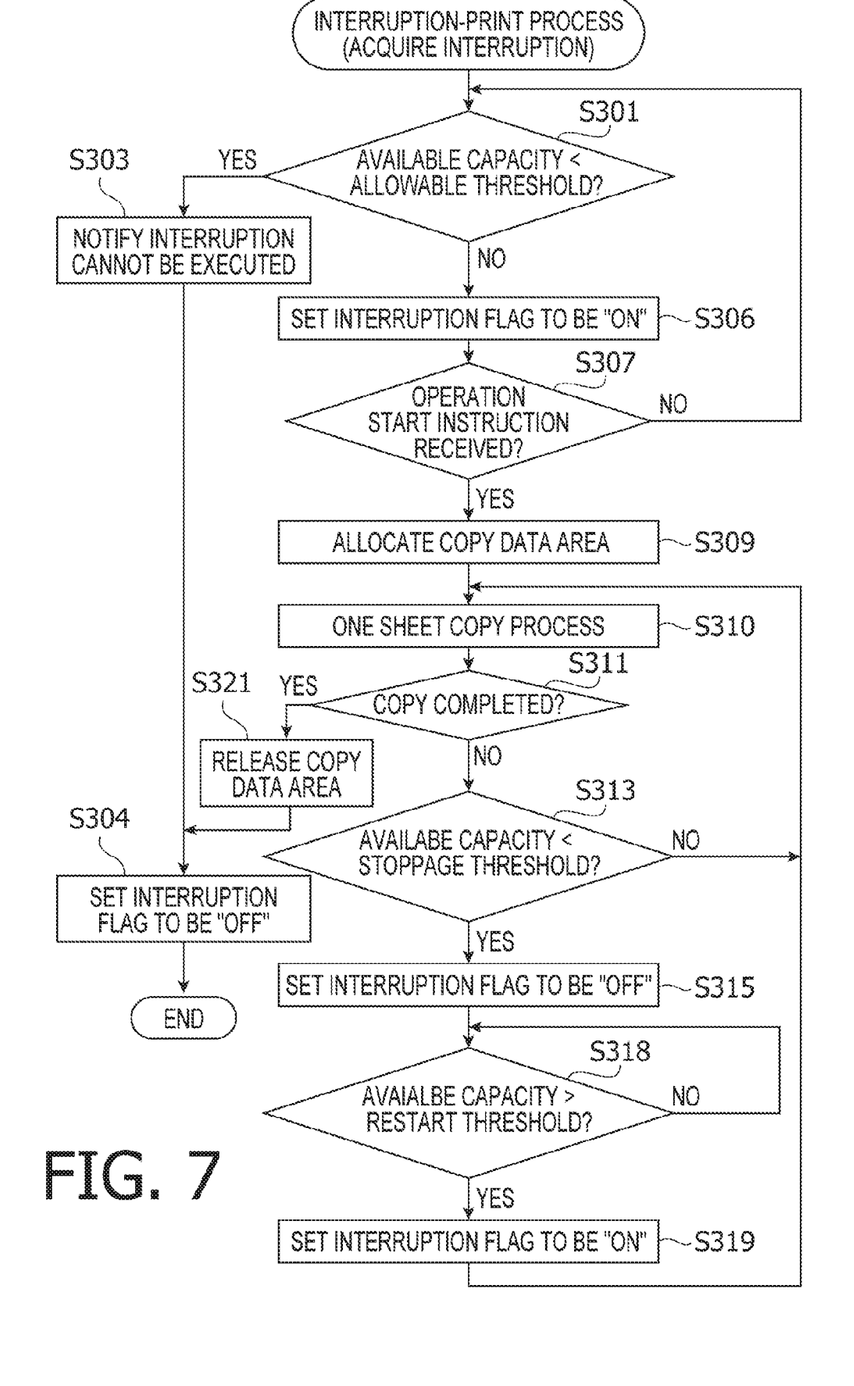
FIG. 7 is a flowchart illustrating an interruption printing process according to the illustrative embodiment of the disclosures.

Next, the interruption printing process which realizes an operation of the interruption printing during execution of the facsimile data will be described with reference to FIG. 7. The interruption printing process is executed by the CPU 31 of the MFP 100 in parallel with the facsimile reception process in response to receipt of a transition instruction to change to the interruption mode during the facsimile data is being received in accordance with the direct-print reception.

In the following description, a case where the copy job is acquired as the interruption printing job will be described.

In the interruption printing process, the MFP 100 determines whether there is a sufficient available capacity in the RAM 33 for allowing the mode to be switched to the interruption mode. For this purpose, the MFP 100 determines whether the available capacity of the RAM 33 is less than an allowable threshold (S301). It is noted that the allowable threshold is a threshold of the available capacity, and switching to the interruption mode is allowed when the available capacity is equal to or larger than the allowable threshold. It is noted that the allowable threshold is an example of a pre-execution threshold value.

The MFP 100 is configured to acquire a transition instruction to the interruption mode, and further acquire instructions regarding operations in the interruption mode such as copy settings and the like after transition to the interruption mode. For example, the MFP 100 acquires settings of a sheet size, a copying magnification, a selection of color or monochrome. In addition to the transition instruction to the interruption mode, the MFP 100 further acquires an instruction to start operating and starts the copying operation. Therefore, reception of the facsimile data may be continued after reception of such instructions. Further, during execution of the copying operation, reception of the facsimile data may be continued. Thus, the allowable threshold value is designed to be the available capacity such that the memory reception can be executed continuously by at least a particular period after the copy data area has been allocated.

Therefore, the MFP 100 determines the allowable threshold value as a sum of the size of the copy data area and a size of the storage area of the facsimile data calculated from the reception speed of the facsimile data and the above-mentioned particular period. Accordingly, the allowable threshold value is a variable value depending on the communication settings of the facsimile reception. It is noted that the allowable threshold value may be a fixed value determined based on the maximum communication capability of the MFP 100.

For example, given that the reception speed of the facsimile data is 34 kbps (kilo bits per second) and the particular period is five minutes, an amount of the facsimile data received during the particular period is 1275 kilo bytes (i.e., 34 Kbits(=4250 bytes)×300 seconds).

When the MFP 100 determines that the available capacity of the RAM 33 is less than the allowable threshold value (S301: YES), the MFP 100 does not acquire an instruction to execute the interruption printing. The MFP 100 notifies that the interruption printing cannot be executed (S303), sets the interruption flag to be "OFF" (S304), and terminates the interruption process. The MFP 100 notifies in S303 that the interruption printing is not acquired by displaying a message on the operation panel 40, by an audio message, by an alarm lamp and/or by an alert sound.

When it is determined that the available capacity of the RAM 33 is equal to or larger than the allowable threshold value (S301: NO), the MFP 100 sets the interruption flag to be "ON" (S306). When the interruption flag is "ON", decision at S201 in the printing process, which is being executed in parallel, is "YES" and printing of the facsimile data will not be executed. The MFP 100 stores the received facsimile data in the reception data memory of the RAM 33 without printing the same when the interruption flag is "ON." That is, by setting the interruption flag to be "ON" at S306, the facsimile reception operation is switched from the direct-print reception to the memory reception. Step S306 is an example of a switching process set forth in the claims.

Next, the MFP 100 determines whether an instruction to start operation in the interruption mode has been received (S307). When it is determined that the operation start instruction has not been received (S307: NO), the MFP 100 returns to S301 and checks the available capacity of the RAM 33.

After the mode has been switched to the interruption mode, the interruption flag is set to be "ON" in S306 and printing of the facsimile data has been stopped. However, since reception of the facsimile data has been continued, before the instruction to start operation is received, the amount of the facsimile data stored in the RAM 33 may increase. Therefore, even if the decision at S301 when the interruption printing process started was "NO", there is a possibility that decision at S301 is "YES" after a certain period has passed. Before the instruction to start operating is received, when it is determined that the available capacity is less than the allowable threshold value, the MFP 100 notify that the MFP 100 does not acquire the interruption printing and terminate the interruption printing process.

When it is determined that the instruction to start operation has been received (S307: YES), the MFP 100 determines the size of the copy data area based on the instructed copy settings, and allocates the copy data area having the determined size in the RAM 33 (S309). Then, the MFP 100 executes a copy process for one sheet (S310). It is noted that S310 is an example of an interruption process set forth in the claims. The MFP 100 causes the image scanning device 20 to scan an original sheet necessary to print on one printing sheet, and causes the image forming device 10 to execute printing based on the scanned image data.

In S311, the MFP 100 determines whether the copy job has been completed. When it is determined that the copy job has not been completed (S311: NO), the MFP 100 determines whether the available capacity of the RAM 33 is less than the stoppage threshold value (S313). It is noted that S313 is an example of a determination process set forth in the claims.

When the currently executed copy job is interrupted and printing of the stored facsimile data is restarted, it will take, for example, thirty seconds, as a switching period, until the size of the storage area allocated for the facsimile data starts decreasing. This exemplary time period is derived based on a case where reception of the facsimile data is continued when printing of the facsimile data retrieved from the reception data memory is being executed. In the MFP 100 according to the illustrative embodiment, the stoppage threshold value is determined so as to avoid a case where reception of the facsimile data cannot be done since the available capacity becomes zero during the third seconds.

According to the illustrative embodiment, the stoppage threshold value is determined to be the same as the size of the reception data memory which is assumed to increase as the facsimile data is received for thirty seconds. In an example mentioned above, the amount of the facsimile data received within thirty seconds is 127.5 Kbytes. According to the illustrative embodiment, the stoppage threshold value is 150 Kbytes. It is noted that the stoppage threshold value is a variable value. However, the stoppage threshold value may be a fixed value. It is noted that the stoppage threshold value is an example of a threshold value and/or a post-execution threshold value set forth in the claims. It is also noted that the stoppage threshold value is a threshold value smaller than the allowable threshold value.

When it is determined that the available capacity of the RAM 33 is equal to or larger than the stoppage threshold value (S313: NO), the MFP 100 proceeds to S310 and executes copying of another sheet. Thereafter, the MFP 100 determines whether copying has been completed (S311).

When it is determined that the available capacity of the RAM 33 is less than the stoppage threshold value (S313: NO), the MFP 100 sets the interruption flag to be "OFF" (S315). It is noted that S315 is an example of the stoppage process set forth in the claims. As the interruption flag is turned to "OFF", decision in S201 of the printing process called in the facsimile reception process, which is being executed in parallel, is "NO" and printing of the facsimile data stored in the reception data memory of the RAM 33 is executed. That is, the MFP 100 retrieves the facsimile data stored in the reception data memory for one sheet, and executes printing of the retrieved facsimile data. It is noted that the printing process executed at this stage is an example of a particular printing process set forth in the claims.

Since the printing process is executed, the MFP 100 releases, within the reception data memory, the storage area which was allocated for the facsimile data, printing of which has been completed. As mentioned above, printing tends to be faster than reception of the facsimile data. Therefore, it is likely that the available capacity of the RAM 33 increases by executing the printing process.

Thereafter, the MFP 100 determines whether the available capacity of the RAM 33 is larger than the particular restart threshold value (S318). It is noted that S318 is an example of a second determining process set forth in the claims. The restart threshold value is a threshold value referred to in order to determine whether the available capacity of the RAM 33 becomes an amount necessary to restart the copying job as the facsimile data has been printed and a part of the reception data memory has been released. The restart threshold value is, for example, an amount calculated by subtracting the amount of the copy data area from the allowable threshold value. The restart threshold value is larger than the stoppage threshold value and less than the allowable threshold value. It is noted that the restart threshold value is an example of the second threshold value set forth in the claims.

When it is determined that the available capacity of the RAM 33 is equal to or less than the restart threshold value (S318: NO), the MFP 100 waits until the available capacity of the RAM 33 becomes larger than the restart threshold value. During this standby period in which the MFP 100 pauses until the available capacity of the RAM 33 becomes larger than the restart threshold value, the copying operation is note executed.

When it is determined that the available threshold value is larger than the restart threshold value (S318: YES), the MFP 100 set the interruption flag to be "ON" (S319). Then, printing in the printing process will not be executed. It is noted that S319 is an example of a second stoppage process set forth in the claims. The MFP 100 then proceeds to S310, and restarts the interruption copy which has been pause. It is noted that S310 in this case is an example of a restart process set forth in the claims.

When it is determined that the copying job, which is instructed to be executed as the interruption process, has been completed (S311: YES), the MFP 100 releases the copy data area that was allocated in S309 (S321), set the interruption flag to be "OFF" (S304) and terminates the interruption printing process.

When the interruption printing process has been completed, if the facsimile reception has not been finished, the MFP 100 continuously executes the facsimile reception process. That is, the MFP 100 executes both facsimile data reception operation and the printing operation (S105) in parallel. Further, after completion of the facsimile reception process, the MFP 100 executes the printing process (S109) until completion of the printing process. It is noted that, in this case, S105 and S109 are examples of a post-interruption printing process set forth in the claims. As afore-mentioned, when the facsimile reception and printing processes have been completed, the MFP 100 terminates the facsimile reception process.

When reception of the facsimile data has been completed during the interruption printing, decision at S107 of the facsimile reception process is "YES" at the time when the reception is completed, and MFP 100 has proceeded to S108. Further, if printing has not completed, the MFP 100 stays at S108. When the interruption flag is set to be "ON" in the interruption printing process, printing is not executed in S109 (i.e., the printing process). Therefore, the facsimile data is remained in the reception data memory of the RAM 33. As the interruption printing process is completed and the interruption flag is set to be "OFF", the MFP 100 executes printing of the facsimile data in the printing process (S109). After completion of the printing process, the MFP 100 terminates the facsimile reception process. It is noted that, in such a case, S109 is an example of a post-printing process.

As described above, the MFP 100 according to the illustrative embodiment is capable of executing, as a reception method of the facsimile data, the direct-print reception and the memory reception. Further, the MFP 100 is capable of acquiring an interruption printing job during execution of the direct-print reception of the facsimile data. When the interruption printing job is acquired during the direct-print reception of the facsimile data, the MFP 100 switches the reception method of the facsimile data from the direct-print reception to the memory reception, and executes the acquired interruption printing job. Further, the MFP 100 determines whether the available capacity which can be allocated as the reception data memory is less than the stoppage threshold value during the interruption printing, and stops the interruption printing job when it is determined that the available capacity is less than the stoppage threshold value. After the interruption printing job is stopped, the MFP 100 executes printing of the facsimile data stored in the reception data memory and releases the storage area which was allocated for the facsimile data that has been printed. Accordingly, after the interruption printing job is started, it is ensured that the facsimile data can be received without fail.

It is noted that the MFP 100 described above is only an illustrative embodiment and is not intended to limit aspects of the disclosures. That is, the above described configurations could further be modified in various ways within the aspects of the disclosures. For example, aspects of the disclosures should not be limited to the MFP but any other apparatuses (e.g., a facsimile device) having functions of the facsimile communication and the printing.

In the description above, as an example of the interruption printing, the copying job is mentioned. However, the interruption printing need not be limited to the copying job. That is, the interruption printing may be any job associated with a printing job. Accordingly, the interruption printing job could be a printing job in which image data from an external device such as a PC (personal computer) or a recording medium such as a USB (universal serial bus) memory, or images are selected through an operation panel.

According to the illustrative embodiment, as threshold values, the allowance threshold value, the stoppage threshold value and the restart threshold value are used. Such a configuration is only an example and aspects of the disclosures do not limit that all the three threshold values are used. For example, if the interruption printing job is not restarted once it is stopped, the restart threshold value is not necessary. For another example, if the interruption job is not the copying job but a PC print job, it is unnecessary to allocate the storage area for data to be used for copying. That is, the size of the storage area which is allocated for the interruption printing is different depending on the kinds of the jobs. If the interruption printing job is a job which does not require a storage area to be preliminarily allocated, the allowance threshold value and the restart threshold value may be the same value. In contrast, if the interruption printing job is of a job that requires that the storage area should be allocated when the job is started, it is preferable that the allowance threshold value is larger than the stoppage threshold value or the restart threshold value.

According to the illustrative embodiment, a time period from the reception method is switched to the usage of the memory starts decreasing is about third seconds. However, aspects of the disclosures need not be limited to the value as illustrated. For example, when the interruption printing job is the PC print job, the switching period is a period from start of one sheet of print according to the PC print job to completion of printing the one sheet and further printing of the facsimile data is started. Further, according to the illustrative embodiment, a time period for determining the allowance threshold is five minutes. However, aspects of the disclosures need not be limited to this value. For example, the MFP 100 may be configured to acquire a user input of the time period, and the allowance threshold value may be determined based on the acquired time period.

According to the illustrative embodiment, after the interruption printing is stopped, when the available capacity becomes sufficiently large, the interruption printing is restarted. However, this configuration may be modified such that the interruption printing is not restarted after it was once stopped. For example, in S315, the interruption flag is set to be "OFF" and the interruption printing may be terminated. Alternatively, a decision step S318 may be omitted, the printing process is executed until facsimile reception and printing of the facsimile data are completed, and thereafter, the interruption printing may be restarted. Optionally, restarting of the interruption printing may be executed when the user inputs an instruction to restart. It is noted that, if the interruption printing is restarted based on the available capacity, the interruption printing can be completed earlier, while if the interruption printing is not restarted based on the available capacity, there is less possibility that the sheet on which the facsimile data is printed and the sheets on which images are formed in the interruption printing mix with each other.

According to the illustrative embodiment, when the transition instruction to the interruption mode, the reception mode is switched to the memory reception mode, and printing of the facsimile data is stopped. This configuration may be changed such that printing of the facsimile data is continued until the instruction to start the interruption printing is received. That is, the illustrative embodiment may be modified such that the direct-print reception is switched to the memory reception after the instruction to start the interruption printing is received. In such a case, the interruption printing process may be started in response to receipt of a start instruction of the interruption printing. Further, in the interruption printing process, S307 may be omitted, and S309 may be executed after execution of S306.

If printing of the facsimile data is stopped in response to the transition instruction to the interruption mode, the interruption printing job can be started earlier based on the start instruction of the interruption printing. Further, user can recognize that the MFP 100 has entered the interruption mode since the direct-print reception is stopped earlier. If printing of the facsimile data is stopped after receipt of the start instruction, since the more amount of facsimile data can be printed before execution of the interruption printing job, possibility of stoppage of the interruption printing due to lack of the available capacity can be lowered.

According to the illustrative embodiment, the stored facsimile data as the reception mode was switched to the memory reception due to the interruption printing is printed after completion of the interruption printing. Aspects of the disclosures need not be limited to such a configuration. For example, after the interruption printing is started, the memory reception of the facsimile data is continued until the end of the facsimile reception, and the thus stored facsimile data may be printed in response to the user's instruction. In such a case, the facsimile reception process shown in FIG. 5 may be modified such that, when decision at S107 is "YES", if the interruption flag is "ON", the facsimile reception process is terminated. If the remainder of the facsimile data is printed automatically after the interruption printing process is terminated, the user can obtain all the printed sheets of the facsimile reception can be obtained. Since the facsimile reception mode was initially the direct-print reception mode, it is preferably that the received facsimile data is printed earlier. If such an automatic printing is not executed after the interruption printing is completed, it is less possible that printed sheets of the facsimile data and printed sheets of the interruption printing are mixed, and the user of the interruption printing can recognize completion of the interruption printing more easily.

It is noted that each of the processes described above may be executed by hardware a single CPU, multiple CPU's, ASIC (application specific integrated circuit), or combination thereof. Further, the each of the processes described above may be realized by a computer-readable medium in which programs corresponding to the processes are stored, methods, or the like.

What is claimed is:

1. A facsimile apparatus comprising:
a facsimile communication device configured to execute a facsimile communication;
a printing device configured to print a plurality of images on a plurality of printing sheets;
a storage device; and
a controller,
wherein the controller is configured to execute:
 a reception process in which the controller executes, as a reception method, one of a direct-print reception and a memory reception, the controller causing the printing device to print an image represented by facsimile data on a printing sheet in response to receipt of the facsimile data in accordance with the direct-print reception, and the controller storing the facsimile data in a storage area allocated in the storage device in accordance with the memory reception;
 a switching process in which the controller switches the reception method from the direct-print reception to the memory reception when an instruction to execute a print job associating printing operation based on interruption print data is received when the controller is executing the direct-print reception of the facsimile data;
 an interruption printing process in which the controller causes the printing device to print images in accordance with the print job after the reception method is switched to the memory reception, the controller allocating an interruption print data area, in which the interruption print data is stored, in the storage device, the reception method in accordance with the memory reception being executed when the interruption printing process is executed; and
 a determination process in which the controller determines whether available capacity of the storage device used in the memory reception is less than a threshold value while the memory reception and the interruption printing process are being executed,
wherein, when the controller determines in the determination process that the available capacity of the storage device is less than the threshold value, the controller executes:
 a stoppage process in which the controller stops the interruption printing process; and
 a particular printing process in which the controller causes the printing device to print the facsimile data stored in the storage device and releases the storage area corresponding to the facsimile data representing the image which has been printed by the printing device.

2. The facsimile apparatus according to claim 1, further comprising a scanning device configured to scan an image on an original sheet,
wherein the print job is a copying job causing the scanning device to scan the image on the original sheet and causing the printing device to print the image scanned by the scanning device on the printing sheet.

3. The facsimile apparatus according to claim 2,
wherein the threshold value is greater than a product of a reception speed of the facsimile data and a switching time,
wherein the reception speed of the facsimile data is amount of received facsimile data per unit time, and wherein the switching time is a time from start of scanning of the original sheet in response to setting of the copying job to start of printing of the facsimile data as the image of the original sheet has been printed.

4. The facsimile apparatus according to claim 1, wherein the controller is further configured to execute:
a second determination process in which the controller determines, during execution of the particular printing process, whether the available capacity of the storage device used in the memory reception is greater than a second threshold value which is greater than the threshold value;
a second stoppage process in which the controller stops the particular printing process when it is determined in the second determination process that the available capacity of the storage device is larger than the second threshold value; and
a restart process in which the controller restarts the interruption printing which was stopped in the stoppage process, after the controller stops the particular printing in the second stoppage process.

5. The facsimile apparatus according to claim 1, further comprising an operation panel configured to receive:
a mode changing instruction which instructs to change an operation mode of the facsimile apparatus to a mode of acquiring a setting of the print job; and
a start instruction which instructs to start processing the print job,
wherein, when the controller receives the mode change instruction via the operation panel, while the controller is receiving the facsimile data by the direct-print reception, the controller is configured to change the reception method from the direct-print reception to the memory reception by executing the switching process, and
wherein, when the controller receives the start instruction via the operation panel, after the direct-print reception is switched to the memory reception in the switching process, the controller is configured to cause the printing device to start printing an image based on the print job.

6. The facsimile apparatus according to claim 5,
wherein the threshold value includes two types of threshold values which are a post-execution threshold value and a pre-execution threshold value which is greater than the post-execution threshold value, and
wherein, in the determining process, the controller is configured to use the pre-execution threshold value before the controller receives the instruction to start the print job and use the post-execution threshold value after the controller receives the instruction to execute the print job, after the reception method is switched from the direct-print reception to the memory reception in the switching process.

7. The facsimile apparatus according to claim 1,
wherein the instruction is to start executing the print job.

8. The facsimile apparatus according to claim 1,
wherein the controller is configured to execute a post-interruption printing process in which the controller causes the printing device to print images of the facsimile data stored in the storage device as the reception method was switched to the memory reception due to execution of the interruption printing, after completion of the interruption printing.

9. A printing method employed in a facsimile apparatus, comprising:

executing, as a reception method, one of a direct-print reception and a memory reception,
wherein a printing device of the facsimile apparatus is caused to print an image represented by facsimile data on a printing sheet in response to receipt of facsimile data in accordance with the direct-print reception, and
the facsimile data is stored in a storage area allocated in a storage device of the facsimile apparatus in accordance with the memory reception;
switching the reception method from the direct-print reception to the memory reception when an instruction to execute a print job associating printing operation based on interruption print data is received when the direct-print reception of the facsimile data is being executed;
executing interruption printing by causing the printing device to print images in accordance with the print job after the reception method is switched to the memory reception, and allocating an interruption print data area, in which the interruption print data is stored, in the storage device, the reception method in accordance with the memory reception being executed when the interruption printing is executed;
determining whether available capacity of the storage device used in the memory reception is less than a threshold value while the memory reception and the interruption printing are being executed; and
when it is determined that the available capacity of the storage device is less than the threshold value:
stopping the interruption printing; and
executing a particular printing process by causing the printing device to print the facsimile data stored in the storage device and releasing the storage area corresponding to the facsimile data representing the image which has been printed by the printing device.

10. A multi-function peripheral comprising:
a public telephone network interface configured to receive facsimile data;
an operation panel configured to receive an instruction;
an image scanning device configured to scan image data of an original sheet;
an image forming device configured to form images on a plurality of sheets;
a memory; and
a controller,
wherein the controller is configured to execute:
a direct-print reception process in which the controller causes the image forming device to form an image represented by the received facsimile data on a sheet,
a memory-reception process in which the controller allocates a storage area for storing the facsimile data in the memory and stores the facsimile data in the storage area;
a copying process in which the controller allocates a copy data area in the memory, causes the image scanning device to scan the image data on the original sheet and form copy data, stores the copy data in the copy data area, and causes the image forming device to form an image represented by the copy data on a sheet; and
a particular printing process in which the controller causes the image forming device to form an image represented by the facsimile data stored in the storage area on a sheet and release the storage area storing the facsimile data representing the image which has been, formed on the sheet, wherein the controller is configured to:
   in response to receiving the facsimile data via the public telephone network interface, start the direct-print reception process;
   in a case that the controller receives an instruction via the operation panel to start the copying process while the controller is executing the direct-print reception process, terminate the direct-print reception process and start the memory-reception process;
   after starting the memory-reception process, start the copying process;
   while executing the memory-reception process and the copying process, determine whether available capacity of the memory is less than a threshold value or not; and
   in a case that the controller determines that the available capacity of the memory is less than the threshold value, pause the copying process and execute the particular printing process.

11. The multi-function peripheral according to claim 10, wherein the threshold value is greater than a product of a reception speed of the facsimile data and a switching time,
wherein the reception speed of the facsimile data is amount of received facsimile data per unit time, and
wherein the switching time is a time from start of scanning of the original sheet in response to setting of the copying process to start of printing of the facsimile data as the image of the original sheet has been printed.

12. The multi-function peripheral according to claim 10, wherein the controller is further configured to:
   determine, during executing of the particular printing process, whether the available capacity of the memory used in the memory reception process is greater than a second threshold value which is greater than the threshold value;
   stop the particular printing process when it is determined that the available capacity of the memory is greater than the second threshold value; and
   restart the copying process which was paused, after the controller stops the particular printing process when it is determined that the available capacity of the memory is greater than the second threshold value.

13. The multi-function peripheral according to claim 10, wherein the instruction to start the copying process comprises a mode change instruction to change an operation mode of the multi-function peripheral to a mode of acquiring a setting of the copying process, and
wherein the controller is further configured to cause the image forming device to form the image represented by the copy data on the sheet on condition that the controller receives the instruction to start the copying process after the direct-print reception is terminated and the memory-reception process is started.

14. The multi-function peripheral according to claim 13, wherein the threshold value comprises a post-execution threshold value and a pre-execution threshold value which is greater than the post-execution threshold value, and
wherein the controller is configured to use the pre-execution threshold value before the controller receives the instruction to start the copying process and use the post-execution threshold value after the controller receives the instruction to execute the copying process, after the direct-print reception process is terminated and the memory-reception process is started.

* * * * *

UNITED STATES PATENT AND TRADEMARK OFFICE
CERTIFICATE OF CORRECTION

PATENT NO. : 9,648,203 B2  
APPLICATION NO. : 15/050578  
DATED : May 9, 2017  
INVENTOR(S) : Chika Tabushi Page 1 of 1

It is certified that error appears in the above-identified patent and that said Letters Patent is hereby corrected as shown below:

In the Claims

Column 18, Claim 10, Line 67 should read:
which has been formed on the sheet,

Signed and Sealed this  
Seventh Day of November, 2017

Joseph Matal  
*Performing the Functions and Duties of the*  
*Under Secretary of Commerce for Intellectual Property and*  
*Director of the United States Patent and Trademark Office*